Sept. 2, 1947.         N. C. STOREY         2,426,652
HYDRAULICALLY STEERED TRACTOR
Filed Oct. 16, 1944         2 Sheets-Sheet 1
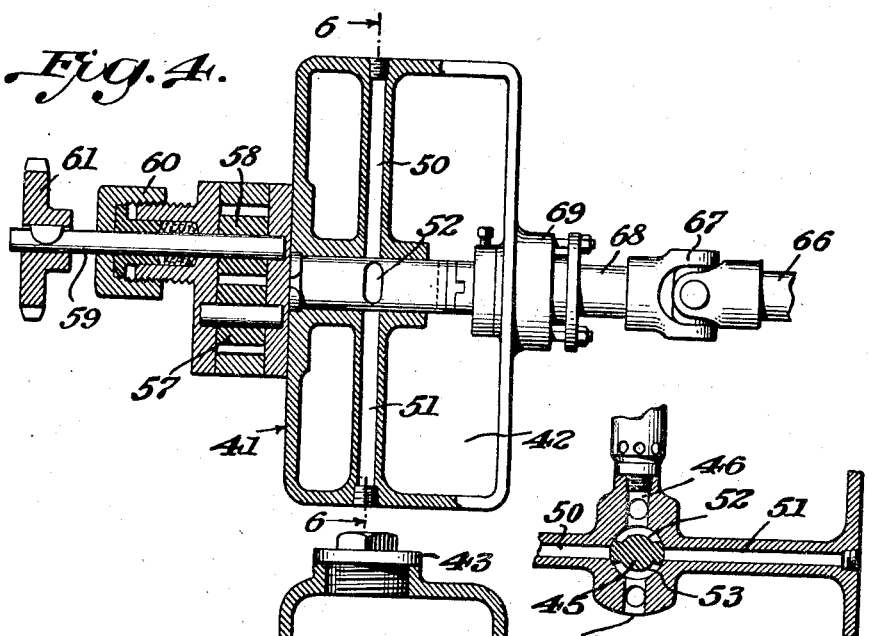
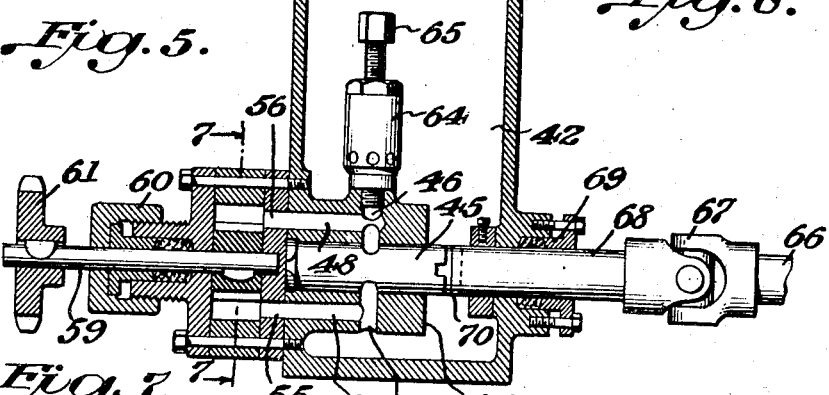
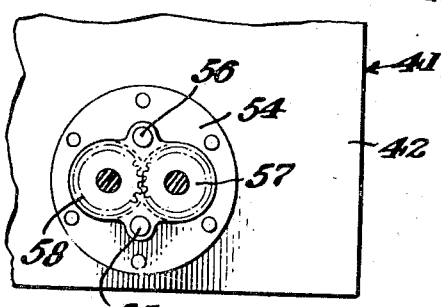
Inventor
Norman C. Storey Sept. 2, 1947.  N. C. STOREY  2,426,652
HYDRAULICALLY STEERED TRACTOR
Filed Oct. 16, 1944  2 Sheets-Sheet 2
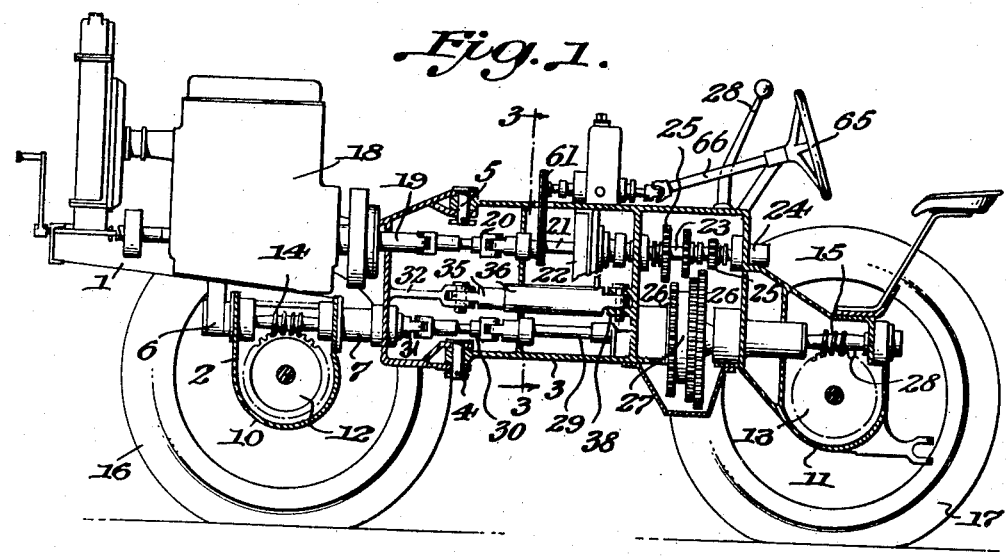
Fig. 1.
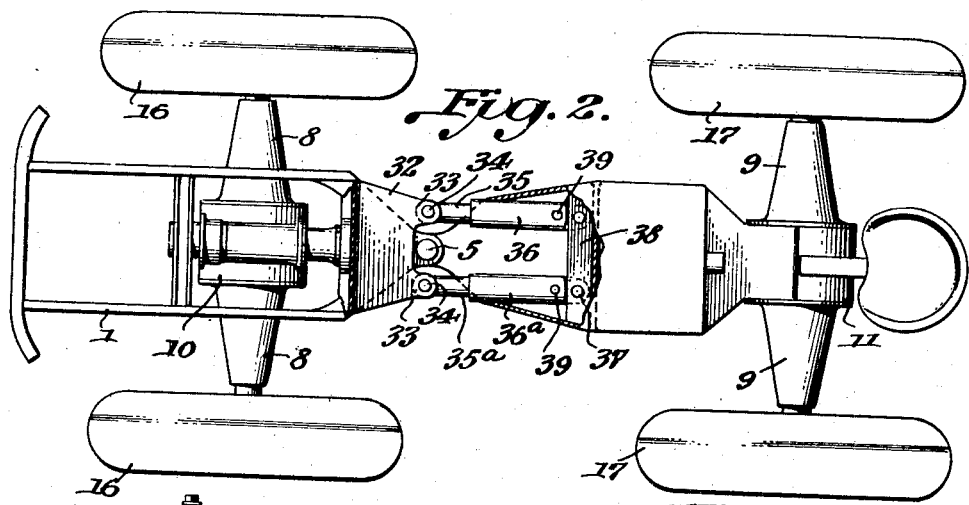
Fig. 2.
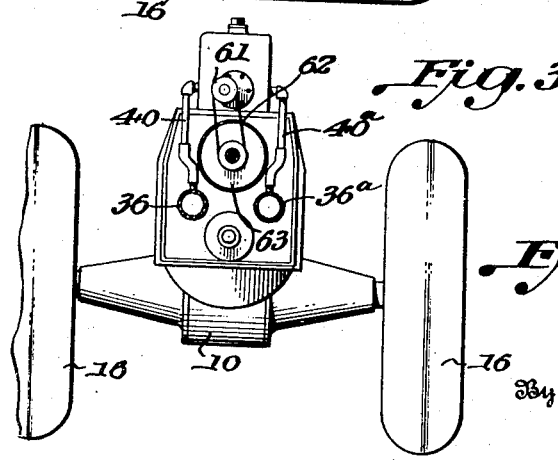
Fig. 3.
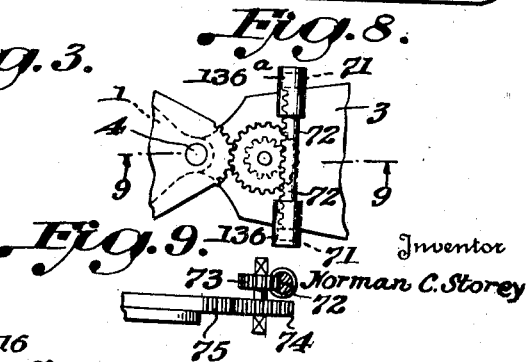
Fig. 8.
Fig. 9.
Inventor
Norman C. Storey
By Young, Emery & Thompson
Attorneys Patented Sept. 2, 1947

2,426,652

UNITED STATES PATENT OFFICE 2,426,652

HYDRAULICALLY STEERED TRACTOR

Norman C. Storey, Miami, Fla.

Application October 16, 1944, Serial No. 558,934

1 Claim. (Cl. 180—79.2)

This invention relates in general to tractors and more particularly has reference to wheeled tractors having steering mechanism enabling short radius turns to be made with little effort on the part of the operator.

In my prior Patent No. 1,957,917 I have disclosed a four wheel drive tractor in which the chassis comprises forward and rear portions connected together by a vertical pivot about which steering movements are effected. This tractor has been found extremely effective against stalling and bogging down in soft terrain and highly maneuverable. Steering is effected by a manually controlled mechanical power actuated device. In employing the tractor under some conditions it is found that steering mechanism requiring less effort on the part of the operator is desirable.

An object of this invention is to provide a wheeled tractor with a simple effective steering mechanism requiring little effort on the part of the operator.

Another object of this invention is to provide a wheeled tractor having two sections pivoted for steering movement about a vertical pivot with fluid actuated steering mechanism.

With these and other objects in view which will appear more fully hereinafter, the present invention resides in the parts and combinations illustrated in the drawings and set forth in the following description.

In the drawings:

Figure 1 is an elevational view of a tractor embodying the principles of the present invention with parts of the housing cut away to illustrate the gearing and coupling connections.

Fig. 2 is a plan view of a tractor with the motor removed and part of the forward and rear frames cut away to illustrate the horizontal locations of the hydraulic steering cylinders.

Fig. 3 is a vertical sectional view taken on line 3—3 of Fig. 1 forward of the hydraulic pump showing the connections from the reservoir ducts to the steering cylinders.

Fig. 4 is a horizontal sectional view on a center line through the hydraulic controlling valve, pump and reservoir showing the ducts from the hydraulic valve through the reservoir.

Fig. 5 is a vertical sectional view on a longitudinal center line through the hydraulic controlling valve, pump and reservoir.

Fig. 6 is a vertical cross section on line 6—6 of Fig. 4.

Fig. 7 is a sectional view taken on line 7—7 of Fig. 5 showing the location of the pump intake and pressure outlet ducts.

Fig. 8 is a more or less diagrammatic representation of a modified form of steering mechanism.

Fig. 9 is a sectional view taken on line 9—9 of Fig. 8.

As shown more particularly in Figs. 1 and 2, the tractor constructed according to the present invention comprises a frame or chassis having a front section 1 supported on a truck frame 2 and a rear section 3. The front and rear sections 1 and 3 are joined together by a vertical pivot here shown as formed of pins 4 and 5, it being understood that these pins are vertically in alignment so as to form, in effect, one vertical pivot. Trunnion bearings 6 and 7 are provided for supporting the front section 1 on the truck frame 2.

As illustrated, truck frame 2 is fitted with axle housing 8 whereas the rear section is supported on axle housing 9. It should be understood that the axles in these housings are operatively connected by means of suitable differentials contained respectively in housings 10 and 11 associated with the axle housings.

Since the details of these differentials are well known in the art, they are not further illustrated herein. The differentials are driven by worm gears 12 and 13, which mesh with worms 14 and 15, respectively.

Truck frame 2 supporting the front section 1 is carried on the two drive wheels 16 and the rear section 3 is carried on the two rear drive wheels 17. Both sets of wheels 16 and 17 are driven by a motor 18 through a suitable transmission as described in Patent No. 1,957,917. This transmission is driven by the rearwardly extending drive shaft 19 of motor 18.

Shaft 19 is coupled by a universal joint 20 to a shaft 21 on the rear section, it being noted that the universal joint is so disposed with respect to the pivot connecting the frame sections, that the shaft 21 will always be rotated regardless of the sections with respect to each other.

Shaft 21 which may be termed the driving shaft terminates in a clutch, the housing of which is designated 22 and which connects the shaft 21 to a driven shaft 23. The clutch may be of any usual construction and may be operated by an actuating lever, not shown. The end of the shaft 23 may be used as a power outlet and for this purpose may be constructed for coupling to any suitable device to be driven as disclosed in my above-mentioned Patent No. 1,957,917. A suitable cover designated by reference character 24 may be provided for encasing the power take off end of shaft 23.

Slidably mounted on the shaft 23 are transmission gears 25 adapted to mesh with gears 26 on a differential housing 27 having an axis parallel to the shaft 23. The gears 25 may be shifted by means of a lever 28 in order to obtain various gear ratios to govern the transmission between the shaft 23 and the differential housing 27.

Housing 27 has mounted therein a differential gearing, the details of which are shown and described in my Patent No. 1,957,917. Extending rearwardly from the differential housing is a propeller shaft 28 which carries the worm 15 and extending forwardly from the differential housing is another propeller shaft 29 which is connected through a universal joint 30 to the propeller shaft 31 carrying the worm 14 meshing with the worm gear 12. By this arrangement the motion transmitted to the differential housing 27 is communicated and distributed to the shafts 28 and 29 and the differential provides a flexible connection permitting the shafts to rotate at different speeds with respect to each other. A suitable clutch may be associated with the differential within the housing 27 as described in my above-mentioned Patent No. 1,957,917 to lock the differential which may be desirable when driving over terrain in which the traction between the driving wheels and the surface over which they are travelling is low and irregular.

As hereinbefore indicated, the front section 1 is supported on the truck frame 2 by means of longitudinally extending trunnion bearings 6 and 7 which with the universal joints permit side tipping of the front wheels in a manner similar to that which is set forth in my prior Patent No. 1,623,214.

Steering of the tractor is effected by causing pivoting movement about pins 4 and 5 of the front and rear sections relative to each other. The present invention differs from that of my prior Patent No. 1,957,917 in the mechanism for effecting this relative movement.

In the present invention steering is hydraulically effected. For this purpose a plate 32 is formed as part of the front frame section 1 and is provided with laterally spaced lugs 33 disposed on each side of the axis of the pivot pins 4 and 5. To each of the lugs 33 there is pivoted by means of a pin 34 one end of a plunger 35, 35a slidably mounted in the open end of a cylinder 36, 36a. Each cylinder 36, 36a is pivotally mounted by means of a pin 37, extending through a lug on its closed end, to a cross member 38 carried by the rear section 3 of the tractor frame.

Adjacent the closed end of each cylinder there is provided a port 39 for the inflow and outflow of actuating fluid supplied through conduits 40 and 40a from a hydraulic control distributing device 41 mounted on the rear section of the frame. Conduits 40 and 40a include flexible portions to permit movement of cylinders 36 and 36a relative to the frame. The control and distributing device comprises an oil reservoir 42 having a filler opening closed by a plug 43.

Extending into the reservoir 42 is a boss 44 which serves as the casing of a control valve body 45. For this purpose the boss is provided with a bore into which the valve body is rotatably mounted. Communicating with the bore containing the valve body are diametrically disposed vertical ducts 46 and 47. The latter ducts are connected to passages 48 and 49 respectively extending parallelly to the axis of the valve body 45. Also communicating with the bore containing the valve body are ducts 50 and 51 which extend horizontally and connect with conduits 40 and 40a respectively.

It will be noted that valve body 45 is provided with two diametrically disposed recesses 52 and 53 which serve to connect ducts 46 and 47 respectively with either of ducts 50 or 51.

A gear pump of conventional design having a housing 54 provided with an intake port 55 and a discharge port 56 is mounted on the side of the reservoir 42 with the intake port 55 in register with passageway 49 and the discharge port 56 in register with passageway 48. Gears 57 and 58 are driven by shaft 59 carrying gear 58. Shaft 59 extends through a packing gland 60 and has a sprocket 61 keyed or otherwise secured thereto. Rotation of shaft 59 and operation of the pump is effected by a chain 62 transmitting motion to sprocket 61 from a sprocket 63 on shaft 21 driven by motor 18.

When the motor is in operation and pump 54 is in operation liquid is withdrawn from the lower portion of reservoir 42 through duct 47, passageway 49 and port 55 and forced by the pump through port 56, passageway 48 and duct 46. A pressure release valve 64 provided with a control stem 65 closes the upper end of duct 46 and permits flow of liquid through the upper end of duct 46 only when the liquid is forced under a predetermined pressure.

Depending upon the position of valve body 45 the liquid under pressure in duct 46 will flow into ducts 50, 51 or through release valve 64. When valve 45 is in a position in which ducts 46 and 50 are connected by recess 52 and ducts 47 and 51 are connected by recess 53 liquid will flow through duct 50 and conduit 40 into cylinder 36 forcing the plunger 35 out of the cylinder and causing the front and rear sections to move so that the front and rear wheels on the right side will move away from each other and so that the wheels on the left side will move toward each other. Simultaneously the plunger 35a will be moved into cylinder 36a forcing the liquid therefrom through conduit 40a, duct 51, recess 53 and duct 47 to reservoir 42. By moving valve 45 so that recess 52 connects ducts 46 and 51 and recess 53 connects ducts 47 and 50, movement in the opposite direction is effected.

Maintenance of the front and rear sections of the tractor in fixed relation is effected by positioning valve 45 as shown in Fig. 6 so that both ducts 50 and 51 are closed. When valve 45 is in this position liquid forced through passageway 48 by the pump is discharged through release valve 64.

A steering wheel 65 is provided and operates valve 45 through steering column 66, universal joint 67 and shaft 68 which passes through a packing gland 69 and is connected to valve 45 through a coupling 70. Thus, depending upon the position of steering wheel 65 and valve 45 controlled thereby, liquid will flow to one of the cylinders 36, 36a and be discharged from the other, or flow to and from both cylinders will be shut off.

Hydraulic steerage of the tractor may be effected with means other than those just described. For instance, as indicated in Figs. 8 and 9, two plungers or pistons connected by a rack 72 may be disposed in cylinders 136 and 136a connected in a manner similar to cylinders 36 and 36a to the control and distributing device. Rack 72 meshes with pinion 73 which drives gear 74 which meshes with a toothed segment 75 carried by the front section of the tractor.

The hydraulic pump, valve and means of operation may be of any conventional type and also the tractor's transmission may be arranged to drive the tractor the same speeds in either direction.

Also the rear section may be supported for tilting movement on a truck frame similar to truck frame 2. In this instance, however, the front section would be rigidly mounted on the axle housing supporting the same.

From the foregoing description it will be apparent that the present invention provides a tractor having a simple, easily controlled steering mechanism and which is highly maneuverable.

Having described my invention, I claim:

A motor driven tractor comprising a frame formed of front and rear sections, each section being supported on a pair of drive wheels, means for connecting the rear portion of the front section to the front portion of the rear section for relative movement about a vertical pivot, hydraulic cylinder means carried by one of said sections, hydraulic piston means in said cylinder means and having a pivotal connection with the other section for effecting pivoting movement of said sections about said pivot, a power transmission including a master clutch mounted on said one section, a motor having a drive shaft driving said transmission through said clutch, a pump having a shaft, means coupling said pump shaft to said drive shaft between said motor and said clutch, and means for controlling and distributing the flow of liquid from said pump to said hydraulic cylinder means, said pump and control means being mounted on the same section with said clutch and transmission.

NORMAN C. STOREY.

REFERENCES CITED

The following references are of record in the file of this patent:

UNITED STATES PATENTS

| Number | Name | Date |
| --- | --- | --- |
| 1,957,917 | Storey | May 8, 1934 |
| 1,358,974 | Mowbray | Nov. 16, 1920 |
| 2,130,274 | Harrison et al | Sept. 13, 1938 |
| 2,051,816 | Bragg | Aug. 25, 1936 |
| 1,138,099 | Fornaca | May 4, 1915 |